May 28, 1935.  A. F. PRANGE  2,002,754
MACHINE FOR MAKING SPRINGS
Filed Oct. 21, 1933  3 Sheets-Sheet 1
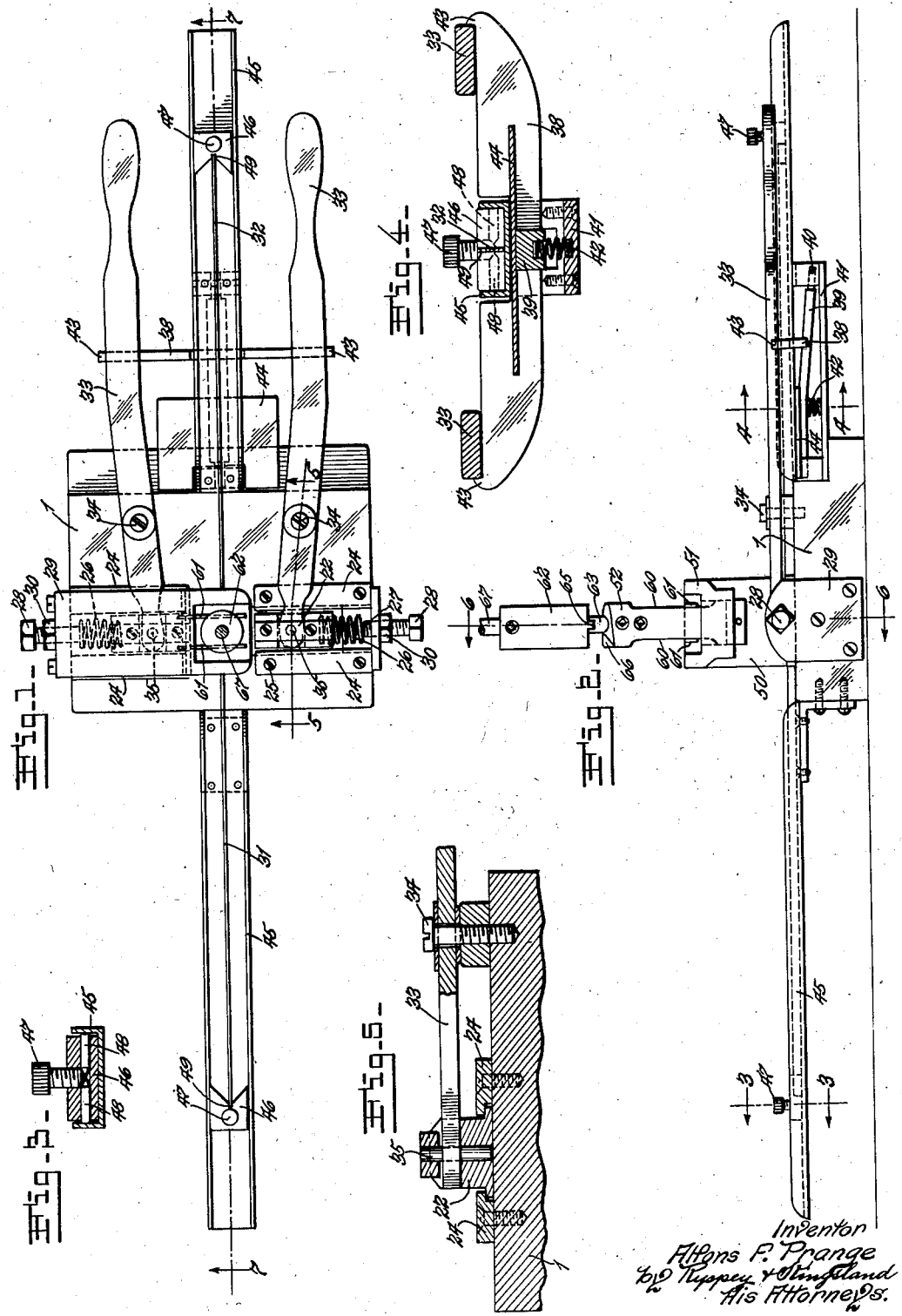

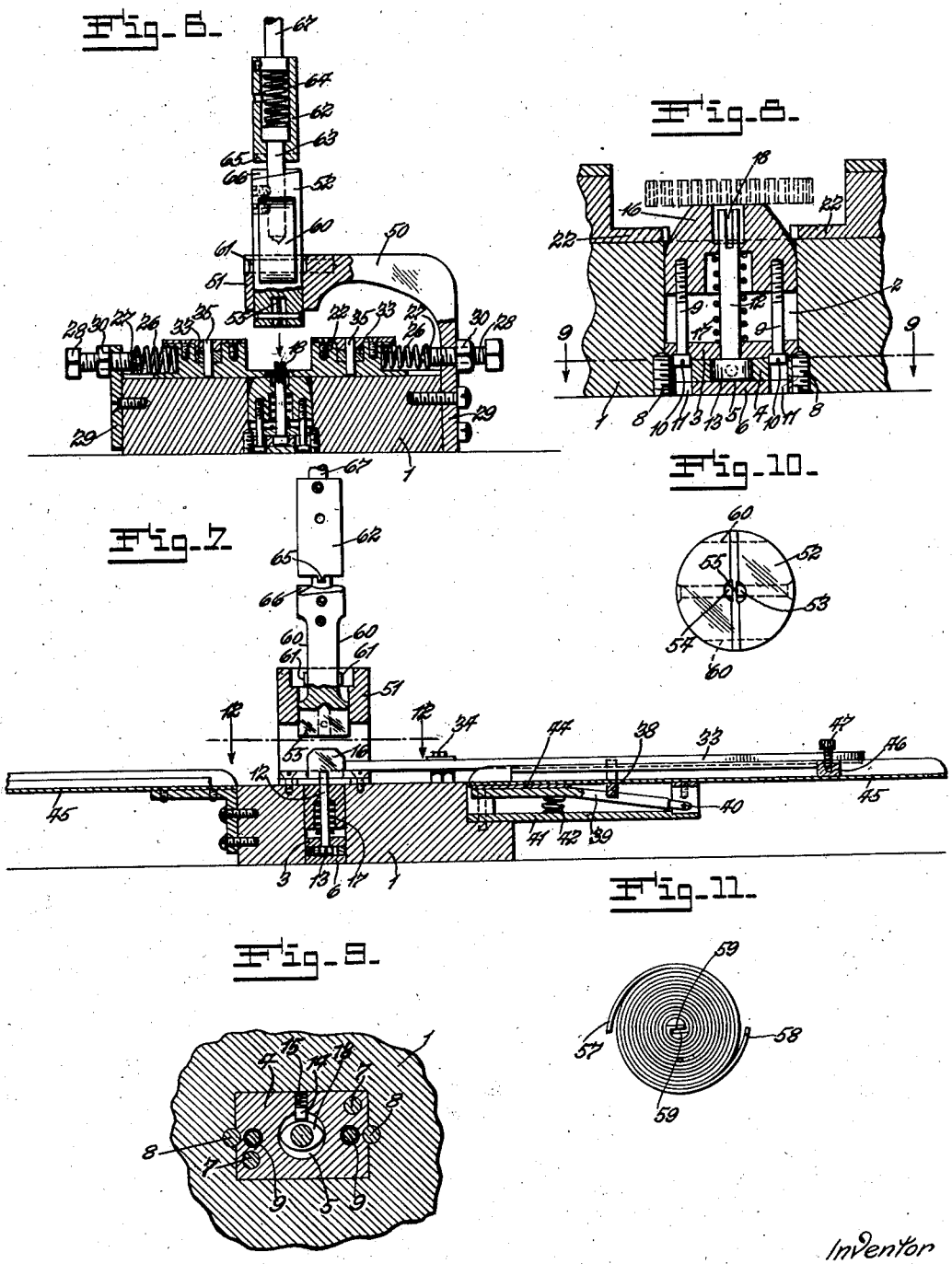

May 28, 1935. A. F. PRANGE 2,002,754
MACHINE FOR MAKING SPRINGS
Filed Oct. 21, 1933 3 Sheets-Sheet 3
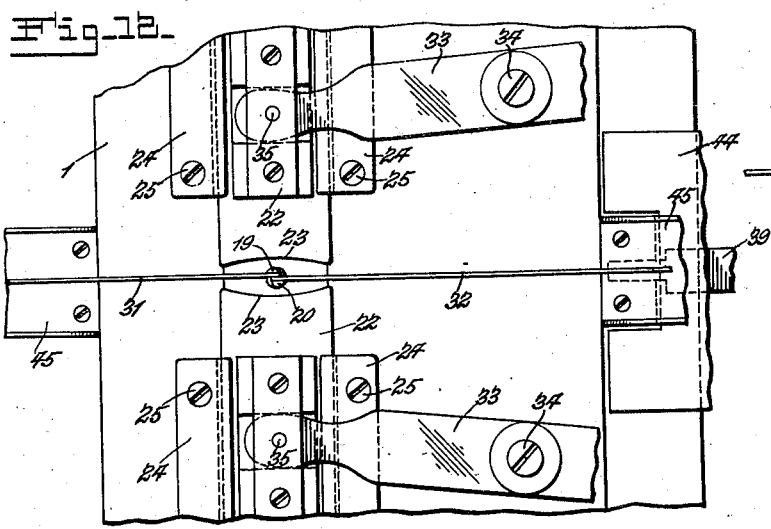
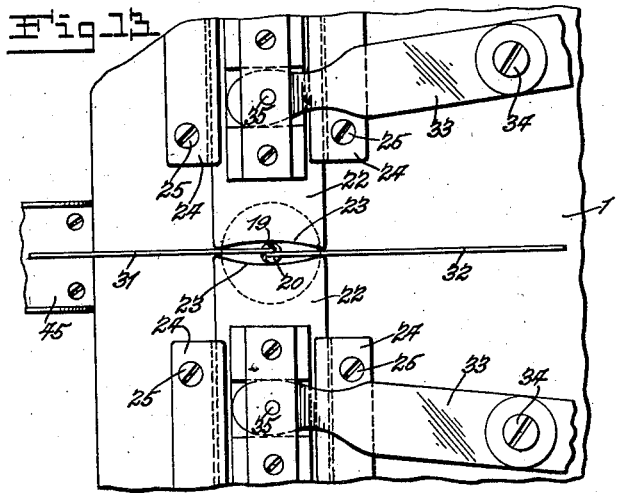
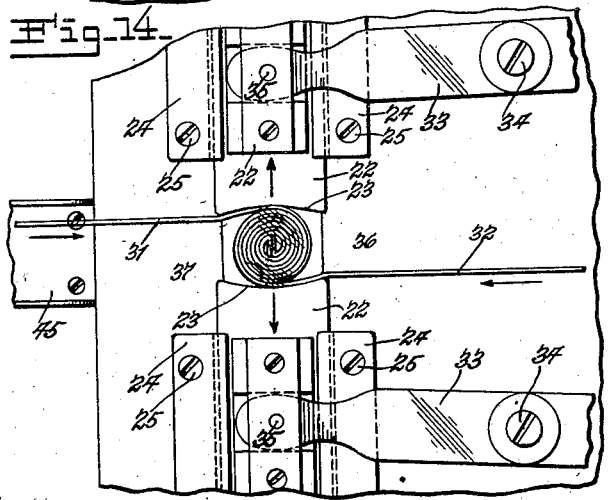
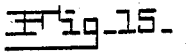
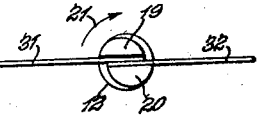
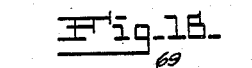
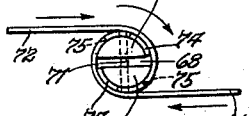
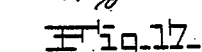
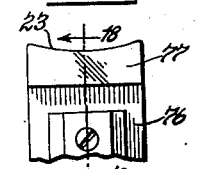
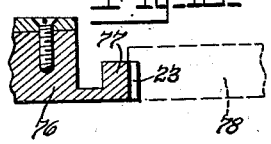
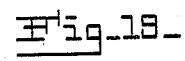
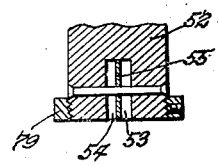

Patented May 28, 1935

2,002,754

UNITED STATES PATENT OFFICE 2,002,754

MACHINE FOR MAKING SPRINGS

Alfons F. Prange, St. Louis County, Mo.

Application October 21, 1933, Serial No. 694,588

17 Claims. (Cl. 153—64)

This invention relates to machines for making springs, and has special reference to machines for making helical springs of the type used for imparting rotary movements to different parts to be driven thereby.

An object of the invention is to provide a machine capable of rapid operation to wind metallic bands or tapes into helical springs having uniform coils of uniform arrangement and tension, so that, when the springs are applied or mounted in the environments in which they are to be used, the springs of the same kind will operate with approximately the same degree of force.

Another object of the invention is to provide means for gaging the bands or tapes in connection with the winding mechanism, so that when said mechanism is operated the bands or tapes will be uniformly wound and tensioned.

Another object of the invention is to provide an improved machine for making springs comprising winding mechanism for winding the springs into helical formation, and means for ejecting the springs from the winding mechanism after the springs have been completed.

Another object of the invention is to provide a machine for making springs having a chuck or connecting device whereby the machine may be operated by a drill press or other operating mechanism.

Various other objects and advantages of the invention will be apparent from the following description, reference being made to the annexed drawings, in which—

Fig. 1 is a plan view of a preferred form of my improved machine for making springs.

Fig. 2 is a side elevation.

Fig. 3 is a vertical cross sectional view of one of the spring supports and gages approximately on the line 3—3 of Fig. 2.

Fig. 4 is a vertical cross sectional view approximately on the line 4—4 of Fig. 2.

Fig. 5 is a sectional view on the line 5—5 of Fig. 1.

Fig. 6 is a vertical cross sectional view of the machine on the line 6—6 of Fig. 2.

Fig. 7 is a vertical longitudinal sectional view of the machine at right angles to the section of Fig. 6.

Fig. 8 is an enlarged sectional view showing the winding device and spring ejector.

Fig. 9 is a sectional view on the line 9—9 of Fig. 8.

Fig. 10 is a lower end view of the actuating device for operating the machine.

Fig. 11 is an enlarged plan view showing a pair of springs in the relationship in which they are simultaneously formed by this machine.

Fig. 12 is an enlarged plan view showing the parts of the machine in the positions they occupy during the time that the bands or tapes are being mounted preparatory for operation of the machine.

Fig. 13 is a similar plan view showing the parts in the position they occupy after the bands or tapes have been located.

Fig. 14 is a similar plan view showing the parts in the position they occupy when the bands or tapes are partially wound into springs.

Fig. 15 is an enlarged plan view of the winding spindle about which the springs are wound.

Fig. 16 is an enlarged plan view of the winding spindle equipped with a pin for engaging the ends of the bands or tapes to be wound into springs having slotted or perforated ends.

Fig. 17 is a plan view of one end of a forming member for use in making springs of bands or tapes that are wider than the bands or tapes wound by the devices shown in the preceding views of the drawings.

Fig. 18 is a sectional view on the line 18—18 of Fig. 17.

Fig. 19 is a sectional view of the lower end view of an operating device capable of use in making springs of larger diameter.

The machine comprises a base 1 having therein a vertical opening 2 (Fig. 8) in the lower portion of which is rigidly secured a solid member 3. A plate 4 is secured to the under side of the member 3 and has a central opening 5 and below the plate 4 a plate 6 is secured. The parts 3, 4 and 6 are attached together by screws 7 and the assembly thus provided is secured in the lower portion of the opening 2 by screws 8.

A pair of rods 9 extend for vertical sliding movements through the solid member 3 and have on their lower ends heads 10 limiting extent of upward movement of said rods and operating in cavities 11 in the parts 4 and 6.

A winding spindle 12 extends vertically through the member 3 and has on its lower end a cam 13 within the recess 5 engaged by a detent 14 mounted for sliding movements in the plate 4 and actuated by a spring 15.

An ejector block 16 is mounted for vertical sliding movements in the opening 2 above the member 3 and the ends of the rods 9 are screwed into the lower portion of said ejector member. The winding spindle 12 projects centrally through the ejector block 16 and does not interfere with the sliding movements of said ejector. The ejector 16 supports the upper end of the winding spindle 12 from lateral movement. A spring 17 is mounted on the spindle 12 having its lower end seated upon the member 3 and its upper end against the ejector member 16 and is operative to raise said ejector member to the position shown in Fig. 8 at the proper time to eject therefrom any spring or springs that have been wound. The upper end of the spindle 12 is formed with the diametrical slot 18 that separates two eccentrically disposed approximately semi-circular extensions 19 and 20, the relative relationship of which is clearly shown in Figs. 15 and 16. The direction of rotation of this spindle 12, when the same is rotated to form springs, is clockwise in the direction of the arrow 21 when the extensions 19 and 20 are in the relationship shown. Of course, it is clear that the relationship of the extension 19 and 20 may be reversed, in which reversed arrangement the spindle 12 should be rotated in the opposite or counter-clockwise direction.

Two alined spring pressing slides 22 are mounted on the base 1 and each has a curved notch 23 in its inner end. The spindle 12 extends upwardly between the inner ends of the spring pressing slides 22. Each spring pressing slide 22 is mounted for inward and outward sliding movements in a guide structure comprising spaced members 24 detachably secured to the upper side of the base 1 by removable and replaceable screws 25. A spring 26 has its inner end abutting against the outer end of each of the slides 22 and its outer end abutting against a shoulder 27 on the inner end of an adjustable screw abutment 28 operatively supported in a side member 29 attached to the adjacent side of the base 1. Lock nuts 30 are screwed on the screw abutments 28 for locking engagement with the members 29 to prevent accidental turning of said screw abutments. The springs 26 are effective to move the spring pressing slides 22 inwardly toward each other and to hold the walls of the notches 23 against the coils of the springs while the springs are being wound by operation of the machine. When the ejector member 16 is in its lower position the inner ends of the spring pressing slides 22 extend over and against the upper wall of said ejector member, as shown in Fig. 6 and Figs. 12, 13 and 14, thus holding the ejector member depressed in opposition to the power of the spring 17 and permitting the inner ends of the metallic bands or tapes 31 and 32 to be engaged in the slot 18 with the ends of said bands or tapes even with the peripheries of the extensions 19 and 20, respectively, as should be understood by reference to Fig. 15.

Levers 33 are mounted on removable and replaceable pivots 34 attached to the base 1 and have their inner ends pivotally engaged with the spring pressing slides 22, respectively, by pivotal connections 35. These levers 33 are operative to move the spring pressing slides 22 outwardly in opposition to the pressure of the springs 26 and, when said slides 22 are moved outwardly beyond the ends of the ejector member 16, said ejector member 16 will be moved upwardly between the inner ends of said slides 22 far enough to eject the springs 36 and 37 from engagement with the spindle 12.

A latch bar 38 is attached to and supported by a lever 39 having one end mounted on a pivot 40 carried by an arm 41 projecting from rigid connection with the base 1 (Fig. 7). A spring 42 mounted between the lever 39 and the arm 41, yieldingly supports the free end of said lever 39, so that the levers 33 will engage shoulders 43 on the latch bar 38 and thereby prevent the springs 26 from moving the spring pressing slides 22 into contact with each other. A key member 44 is attached to the lever 39 and is manually engageable and operative to depress said lever and thereby move the latch bar 38 downwardly out of engagement with the levers 33 to permit the springs 26 to move the spring pressing slides 22 inwardly to abutting contact.

A pair of supporting arms 45 in the form of channels are attached to opposite sides of the base 1. A gage 46 is mounted for inward and outward sliding movements in each arm 45 and is equipped with a latch comprising a manually operative screw 47 screwed in the body of the gage 46 and engageable with lock bolts 48 movably mounted in the body of the gage 46 for clamping engagement with the walls of the channel arm 45. The inner side of each gage 46 has a notch 49 designed and adapted to receive the outer ends of the bands or tapes 31 and 32 while the inner ends of said bands or tapes are positioned so that they are even or approximately even with the peripheral walls of the extensions 19 and 20, respectively. Thus, these gages may be moved along the arms 45 and secured in different adjusted positions thereon to gage bands or tapes of different lengths.

One of the members 29 has a bracket arm 50 (Fig. 6) extending inwardly over the spindle 12 and over the ejector 16 and provided with a socket 51. An operating device comprising a chuck member 52 is mounted for sliding and turning movements in the socket 51 and has in its lower end openings 53 and 54 shaped like the extensions 19 and 20 and designed and adapted to receive said extensions, respectively, (Fig. 10). A key plate 55 is mounted in a slot in the lower end of the chuck member 52 and extends between the openings 53 and 54 and is designed and adapted to be received in the slot 18 above the upper edges of the bands or tapes 31 and 32 and above the inner ends of the spring pressing slides 22. Therefore, when the device 52, which is mounted in the socket 51, is interlocked with the spindle 12 and rotated it will wind the bands or tapes 31 and 32 around said spindle and around each other in symmetrical uniform spirals, producing symmetrical and uniformly wound springs 56 and 57 having uniformly shaped angular inner ends 58 and 59. These springs can then be easily separated from each other by pushing them apart and when wound in this way the coils of the springs are in almost exact uniformity and the springs are of almost uniform tension, the only difference, if any, being due to the character and quality of the metal forming the springs. During this winding operation, pressure is applied against the coils of the springs continuously and uniformly by the spring pressing slides 22, as clearly shown in Fig. 14.

The member 52 may be easily placed in proper position for engagement of the key member 55 in the slot 18 by providing flat surfaces 60 on the sides of the member 52 for engagement by leaf springs 61 mounted on the bracket 50 in proper relationship to obtain the desired adjustment.

A clutch member 62 is mounted for sliding movements on a stem 63 attached to the upper end of the member 52 and is supported out of clutch engagement with the member 52 by a spring 64 (Fig. 6). The spring 64 permits the clutch member 62 to be moved downwardly to engage the clutch portion 65 on the lower end thereof with a clutch portion 66 on the upper end of the part 52 so as to rotate said part 52 by the clutch member 62. A connecting device 67 is attached to the upper end of the clutch member 62 for engagement with and operation by an ordinary drill press, for instance. However, the device may be operated in any desired way without departing from the principle of the invention.

In operation, the gages 46 are secured in proper position on the arms 45 to locate and gage the bands or tapes 31 and 32 in such a way that when the outer ends of said bands or tapes are engaged in the gage notches 49 the inner ends of said bands or tapes are even with the peripheral surfaces of the extensions 19 and 20, respectively. During the time that the bands or tapes are being mounted, the ejector 16 is held in its lower position by the inner ends of the spring pressing slides 22 which extend over and against the upper surface of the ejector member. This permits the inner ends of the bands or tapes 31 and 32 to be placed in the slot 18. During the placement of the bands or tapes 31 and 32, the member 52 is supported in a raised position, as shown in Fig. 6. After the bands or tapes have been mounted in the manner mentioned, the member 52 is moved downwardly to engage the key member 55 in the upper portion of the slot 18 above the bands or tapes 31 and 32. Then the clutch member 62 is moved downwardly into clutching engagement with the member 52 and rotated to rotate the spindle 12 and thereby wind the bands or tapes 31 and 32 around said spindle and around each other, pressure being applied to the coils as they are wound by the spring pressing slides 22. After the springs have been completely wound, the member 52 is raised and disengaged from the spindle 12. If the slides 22 have been moved outwardly far enough, the ejector 16 will immediately be raised by the spring 17 and eject the springs from engagement with the spindle 12. But, if the slides have not been moved outwardly far enough to permit upward movement of the ejector 16, said slides may be moved by the levers 33.

The spindle 12 shown in Fig. 16 has a slot 68 in its upper end separating two eccentrically disposed approximately semi-circular extensions 69 and 70. A pin 71 extends through the extensions 69 and 70 and has its ends projecting beyond the peripheral surfaces of said extensions a distance approximately equal to the thickness of the resilient bands or tapes 72 and 73. These bands or tapes 72 and 73 are formed with curved terminal portions 74 that curve in conformity with the peripheral surfaces of the extensions 69 and 70 and are also formed with slots or holes 75 through said curved terminal portions adapted to be engaged with projecting ends of the pin 71 while the outer ends of the bands or tapes 72 and 73 are engaged in the gage notches 49 in the manner in which the outer ends of the bands or tapes 31 and 32 are engaged in said notches 49. The slot 68 is provided to receive the key plate 55 in the manner in which the slot 18 receives said key plate, it being understood that the spindle 12 extends above the upper edges of the bands or tapes 72 and 73 in order to receive the key plate 55 in said slot 68 just as the spindle 12 extends above the upper edges of the bands or tapes 31 and 32 in order to receive the key plate 55 in the slot 18. The springs having the curved terminal portions 74 at their inner ends are otherwise the same as the springs 57 and 58 and are wound in the same manner.

When desired, the slides 22 may be removed and other slides 76 (Fig. 18) substituted therefor, the slides 76 being provided with thickened or raised flanges 77 on their inner ends in order to press against the peripheral surfaces of coils 78 formed of wider bands or tapes than the bands or tapes 31 and 32. Thus, the machine may be easily changed so as to coil bands or tapes of various widths into coil springs.

If desired, the lower end of the member 52 may be provided with screw threads, as shown in Fig. 19, and a collar 79 may be screwed thereon in order to exert pressure upon the upper edges of coil springs of greater length than when the device 52 alone is used. Thus, when comparatively short bands or tapes are to be coiled into springs the collar 79 may be omitted, but when longer bands or tapes are to be coiled into springs, the resilient coiled springs will be of greater diameter than the diameter of coiled springs made of shorter bands or tapes and in such case the collar 79 may be used.

The invention may be varied in other particulars than in the particulars specifically mentioned and I contemplate such variations as will obtain best results without departure from the principle of the invention.

It should now be apparent that this invention obtains all of its intended objects and purposes efficiently and satisfactorily and may be operated with great rapidity and will make springs of approximately uniform winding and tension, and a single operator by use of this machine can make as many springs as many operators can make by some of the antiquated methods of spring making now in use.

I do not restrict myself in unessential particulars but what I claim and desire to secure by Letters Patent is:

1. A machine for making springs comprising a base, a rotative spindle supported vertically by said base and having a vertical slot in its upper end adapted to receive the inner ends of bands or tapes to be coiled into springs, a spring ejector mounted in said base and supporting the upper end of said spindle and means supported above said base and engageable with said upper end of said spindle for rotating the same to coil said bands or tapes around said spindle and around each other.

2. A machine for making springs comprising a base, a vertical rotative spindle supported by said base and having a slot in its upper end adapted to receive the inner end of a band or tape to be coiled into a coil spring, a gage device for locating said band or tape so that the inner end thereof is approximately even with a peripheral surface of said spindle, a spring ejector mounted in said base and supporting the upper end of said spindle, and mechanism engageable with said spindle to rotate the same and coil said band or tape around said spindle.

3. A machine for making springs comprising a base, a rotative spindle supported by said base and having a vertical slot in its upper end adapted to receive the inner ends of bands or tapes to be coiled into springs, a spring ejector mounted in said base and supporting the upper end of said spindle, means engageable with said spindle for rotating the same to coil said bands or tapes around said spindle and around each other, devices for engaging said means with and disengaging said means from said spindle, and spring pressing slides yieldingly pressed against said coils.

4. A machine for making springs comprising a base, a vertical rotative spindle supported by said base and having a slot in its upper end adapted to receive the inner end of a band or tape to be coiled into a coil spring, a gage device for locating said band or tape so that the inner end thereof is approximately even with a peripheral surface of said spindle, mechanism engageable with said spindle to rotate the same and coil said band or tape around said spindle, a spring ejector mounted in said base and supporting the upper end of said spindle, and spring pressing slides yieldingly pressed against said coils.

5. A machine for making springs comprising a vertical rotative spindle having a vertical slot in its upper end adapted to receive the inner end of a band or tape to be coiled into a spring, gaging means for locating the band or tape in a predetermined relationship with respect to said spindle, a spring ejector mounted for sliding movements along said spindle, means for holding said ejector from lateral movements, means engageable with said spindle for rotating the same to coil said band or tape around said spindle, and spring pressing slides yieldingly pressed against the coils of said band or tape during the coiling thereof.

6. A machine for making springs comprising a rotative spindle having a vertical slot in its upper end adapted to receive in overlapped relationship the inner ends of bands or tapes to be coiled into springs, gage devices for locating the bands or tapes in proper relationship with respect to each other and to said spindle, means for positioning said spindle so that said slot extends toward said gage devices, and means for rotating said spindle to form said bands or tapes into coils around said spindle and around each other.

7. A machine for making springs comprising a vertical rotative spindle having a vertical slot in its upper end adapted to receive in overlapped relationship the inner ends of bands or tapes to be coiled into springs, means for rotating said spindle to form said bands or tapes into coils around said spindle and around each other, a guide, an ejector mounted in said guide for ejecting said coils from said spindle, means for operating said ejector, and means controlling said ejector.

8. A machine for making springs comprising a vertical rotative spindle having a vertical slot in its upper end adapted to receive in overlapped relationship the inner ends of bands or tapes to be coiled into springs, means for rotating said spindle to form said bands or tapes into coils around said spindle and around each other, an ejector for ejecting said coils from said spindle, and spring pressing slides operative to press against said coils during the formation of said coils and controlling operation of said ejector.

9. A machine for making springs comprising a vertical rotative spindle having a vertical slot in its upper end adapted to receive in overlapped relationship the inner ends of bands or tapes to be coiled into springs, means for rotating said spindle to form said bands or tapes into coils around said spindle and around each other, an ejector for ejecting said coils from said spindle, spring pressing slides operative to press against said coils during the formation of said coils and controlling operation of said ejector, and means for operating said slides to relieve said ejector from control thereby.

10. A machine for making springs comprising a base, a vertical rotative spindle supported by said base having a slot in its upper end adapted to receive in overlapped relationship the inner ends of bands or tapes to be coiled into springs, a device for positioning said spindle preparatory for placement of the inner ends of said bands or tapes in said slot as aforesaid, and means for rotating said spindle to form said bands or tapes into coils around said spindle and around each other.

11. A machine for making springs comprising a base, a vertical rotative spindle supported by said base having a slot in its upper end adapted to receive in overlapped relationship the inner ends of bands or tapes to be coiled into springs, a device for positioning said spindle preparatory for placement of the inner ends of said bands or tapes in said slot as aforesaid, means for rotating said spindle to form said bands or tapes into coils around said spindle and around each other, an ejector for ejecting said coiled bands or tapes from said spindle, and means for controlling operation of said ejector and for applying pressure against said coils during formation of said coils.

12. A machine for making springs comprising a base having an opening therein, a vertical rotative spindle extending upwardly in said opening and having a vertical slot in its upper end adapted to receive the end of a band or tape to be coiled into a spring, gaging means for locating the band or tape in a predetermined relationship with respect to said spindle, a spring ejector mounted for sliding movements along said spindle in said opening in said base and being held from lateral movements by the wall of said opening, and means engageable with said spindle for rotating the same to coil said band or tape around said spindle.

13. A machine for making springs comprising a base having an opening therein, a vertical rotative spindle extending upwardly in said opening and having a vertical slot in its upper end adapted to receive the end of a band or tape to be coiled into a spring, gaging means for locating the band or tape in a predetermined relationship with respect to said spindle, a spring ejector mounted for sliding movements along said spindle in said opening in said base and being held from lateral movements by the wall of said opening, means engageable with said spindle for rotating the same to coil said band or tape around said spindle, and spring pressing slides yieldingly pressed against the coils of said band or tape during the coiling thereof.

14. A machine for making springs comprising a base having an opening therein, a vertical rotative spindle in said opening having a vertical slot in its upper end adapted to receive in overlapped relationship the ends of bands or tapes to be coiled into springs, means for uniformly gaging said bands or tapes in proper relationship to each other and to said spindle, a spring ejector mounted in said opening for sliding movements along said spindle and being held from lateral movements by the wall of said opening, means engageable with said spindle for rotating the same to form said bands or tapes into coils around said spindle and around each other, and devices for applying pressure against the outer surfaces of said coils during winding thereof.

15. A machine for making springs comprising a base having an opening therein, a vertical rotative spindle mounted in said opening and having a vertical slot in its upper end beyond the upper side of said base and adapted to receive in overlapped relationship the inner ends of bands or tapes to be coiled into springs, means for uniformly gaging said bands or tapes in proper relationship to each other and to said spindle, means engageable with said spindle for rotating the same to form said bands or tapes into coils around said spindle and around each other, an ejector mounted in said opening for sliding movements along said spindle and being held from lateral movement by the wall of said opening, a spring mounted in said opening and actuating said ejector upwardly, and means for moving said ejector in opposition to said spring to position to permit a spring to be wound.

16. A machine for making springs comprising a base having an opening therein, a rotative spindle mounted in said opening and having relatively eccentric extensions on its upper end separated by an intervening slot which is adapted to receive in overlapping relationship the inner ends of bands or tapes to be coiled into coils, gaging means for locating the inner ends of said bands or tapes in approximate alinement with peripheral portions of said extensions respectively, means for engaging and rotating said spindle to form said bands or tapes into coils around said spindle and around each other, an ejector mounted in said opening for upward sliding movements to disengage said coils from said spindle, and devices for moving said ejector to position to permit a spring to be wound and for applying pressure against said spring during winding thereof.

17. A machine for making springs comprising a base having an opening therein, a rotative spindle mounted in said opening and having relatively eccentric extensions on its upper end separated by an intervening slot which is adapted to receive in overlapping relationship the inner ends of bands or tapes to be coiled into coils, gaging means for locating the inner ends of said bands or tapes in approximate alinement with peripheral portions of said extensions respectively, means for engaging and rotating said spindle to form said bands or tapes into coils around said spindle and around each other, an ejector mounted in said opening for upward sliding movements to disengage said coils from said spindle, means for operating said ejector, and means for limiting extent of movement of said ejector.

ALFONS F. PRANGE.